United States Patent
Foster et al.

(12) 
(10) Patent No.: US 6,929,438 B1
(45) Date of Patent: Aug. 16, 2005

(54) CARGO RESTRAINT APPARATUS

(75) Inventors: Robin L. Foster, Midland, MI (US); James E. Dailey, Coleman, MI (US)

(73) Assignees: Robinson Industries, Inc., Coleman, MI (US); Homestead Tool & Machine, Inc., Coleman, MI (US)

( * ) Notice: Subject to any disclaimer, the term of this patent is extended or adjusted under 35 U.S.C. 154(b) by 0 days.

(21) Appl. No.: 10/810,915

(22) Filed: Mar. 26, 2004

(51) Int. Cl.[7] ............................ B60P 7/06; B61D 45/00
(52) U.S. Cl. ..................... 410/46; 410/100; 410/103
(58) Field of Search .................... 410/46, 100, 101, 410/103, 112, 113, 114, 115, 116; 24/265 CD, 24/115 K; 248/499

(56) References Cited

U.S. PATENT DOCUMENTS

| | | | |
|---|---|---|---|
| 2,775,463 A | | 12/1954 | Chenette |
| 3,175,806 A | | 11/1963 | Prete, Jr. |
| 3,508,502 A | * | 4/1970 | Sims .......................... 410/103 |
| 3,804,368 A | | 4/1974 | Bailey |
| 4,243,350 A | * | 1/1981 | Hall ........................... 410/100 |
| 4,340,329 A | * | 7/1982 | Ericsson ..................... 410/101 |
| 4,382,736 A | * | 5/1983 | Thomas ...................... 410/104 |
| 4,842,458 A | * | 6/1989 | Carpenter ...................... 410/3 |
| 4,884,928 A | * | 12/1989 | Nachtigall et al. .......... 410/103 |
| 5,101,537 A | | 4/1992 | Cummings |
| 5,145,299 A | | 9/1992 | Stephenson, Jr. |
| 5,186,586 A | | 2/1993 | Stephenson, Jr. |
| 5,314,275 A | * | 5/1994 | Cottrell et al. ................ 410/26 |
| 5,490,749 A | | 2/1996 | Arbues |
| 5,549,429 A | | 8/1996 | Sergent |
| 5,636,951 A | * | 6/1997 | Long et al. .................... 410/85 |
| 5,853,164 A | * | 12/1998 | Hunt .......................... 254/213 |
| 5,943,742 A | | 8/1999 | Huang |
| 6,007,053 A | * | 12/1999 | Huang ........................ 254/247 |
| 6,059,499 A | | 5/2000 | Bird |
| 6,139,234 A | * | 10/2000 | Huang ........................ 410/103 |
| 6,141,840 A | | 11/2000 | Berkes |
| 6,742,972 B2 | * | 6/2004 | Brunet ....................... 410/103 |
| 2003/0031524 A1 | | 2/2003 | Brunet |
| 2003/0059269 A1 | * | 3/2003 | Bosley ....................... 410/100 |
| 2003/0084550 A1 | | 5/2003 | Fang |

* cited by examiner

*Primary Examiner*—H. Gutman
(74) *Attorney, Agent, or Firm*—Ian C. McLeod

(57) ABSTRACT

The present invention includes an improved cargo restraint apparatus (10). The cargo restraint apparatus (10) comprises a pallet (20), a reel (30) having a locking mechanism, and a lock release (43, 143, 243) having a pressure plate (44, 144, 244) and a release shaft (45, 145, 245) having a rotation restricting widthwise cross-section. A force is applied to the pressure plate (44, 144, 244) to unlock the reel (30). The pressure plate (44, 144, 244) allows a user to release the restraints quickly and easily by kicking the pressure plate while keeping the user's hands free.

11 Claims, 5 Drawing Sheets

CARGO RESTRAINT APPARATUS

CROSS-REFERENCE TO RELATED APPLICATIONS

None

STATEMENT REGARDING FEDERALLY SPONSORED RESEARCH OR DEVELOPMENT

None

BACKGROUND OF THE INVENTION (1) Field of the Invention

The present invention relates generally to cargo restraint devices and more particularly to cargo restraint devices using a pawl and ratchet tensioning systems with a belt or strap to secure the cargo to a pallet.

(2) Description of the Related Art

A wide array of cargos are transported each day upon pallets which require restraint devices to securely hold them upon the transport vehicle during transit. Cargo restraint devices typically utilize pawl and ratchet locking mechanisms to keep a strap tight over the cargo. The cargo loaded pallets are stacked on top of one another upon the vehicle, so that the weight of the cargo causes the restraint straps of the lower pallets to loosen and the pawl and ratchet to lock the strap in a more retracted position than originally set by the operator. When the weight of the cargo pallets stacked above are removed at the destination, the straps become exceedingly tight, which wedges the pawl against the teeth of the ratchet under such a pressure so as to make it difficult to disengage the pawl and release the strap. This forces operators to use their hands to release heavy cargos in an unsafe manner. While related cargo restraint devices utilize straps locked by pawl and ratchet systems, there are no hands-free devices which can be easily kicked to force a pawl to disengage from a ratchet to allow a safe and quick release of restraint straps from cargo on a pallet.

U.S. Pat. No. 2,775,463 to Chenette discloses an appliance hand truck having an endless belt track for easy transport up a stairway. The appliance hand truck has a tensioning means for a restraining strap to hold the appliance securely on the truck. The strap tensioning means uses a pawl to prevent the reverse rotation of the ratchet wheel when a strap is under tension. To release the tensions upon the strap, the pawl 44 is disengaged from the ratchet wheel by pulling an end of the pawl to disengage it from the ratchet wheel.

U.S. Pat. No. 3,175,806 to Prete, Jr discloses a ratchet type buckle for tensioning an elongated flexible member such as a strap, rope or cable. The ratchet type buckle has a driving pawl for engaging ratchet teeth. The inner end of the driving pawl is formed with two pawl fingers that straddle the spool for the purpose of engaging the ratchet teeth to drive the spool in the direction to wind in the strap. When the spool is to be released for reverse rotation to release the strap, the handle 64 manually retracts the driving pawl and the pawl is held in the retracted position to prevent further engagement with the ratchet teeth.

U.S. Pat. No. 3,804,368 to Bailey discloses a ratchet tensioner comprising a reciprocal lever mounting a first pawl engaging a ratchet wheel connected to two parallel bars forming a reel. When the lever moves in the opposite direction, the first pawl rides over the ratchet wheel and a second pawl engages the ratchet wheel to prevent unwinding of webbing from the reel. The pawls are lifted out of engagement with the ratchet wheel to allow the reel to freely rotate by manually pulling the release member 37.

U.S. Pat. No. 5,101,537 to Cummings discloses a ratchet tie down structure that is designed to hold heavy objects in place on a transport vehicle. The mechanism includes a base element attached to the transport vehicle that has pair of cooperating elements having interfitting ratchet teeth and a latch that permits a shaft to be turned in one direction to tighten a flexible holding element attached to the object. The ratchet teeth can be disengaged by fitting the plain end of a bar into one of the sockets of the latch and pushing the latch inwardly against the bias of the spring to disengage the ratchet teeth of the two elements.

U.S. Pat. Nos. 5,145,299 and 5,186,586 to Stephenson, Jr. disclose a remote release mechanism which permits restraints such as flat straps placed around a load and placed in tension by a winch to be released by an operator positioned on the same side of the transportation structure as the winch. This permits the hook end of a load restraint to be released from the winch side of the transportation structure, eliminating the need to perform separate operations on either side of the restraint mechanism. The apparatus comprises a hook bar connected to a rotatable drum which is held from rotation in one direction by a pawl 112 and ratchet. The pawl is released by the pulling a remote release rod to swing the pawl from the teeth of the ratchet.

U.S. Pat. No. 5,490,749 to Arbues discloses a winch for securing the tie down straps used to restrain cargo transported on a flatbed vehicle. The winch includes a rigid frame having a rotatable winch drum on which the strap may be wound. A ratchet wheel on the end of the winch drum includes two sets of teeth which are axially offset and circumferentially staggered relative to each other. A pawl for locking the ratchet wheel has two similarly offset and staggered sets of teeth. The teeth of the pawl and ratchet wheel interlock at locations that are both axially and circumferentially offset to distribute the stresses and enhance the structural strength of the winch. The end of the pawl presents a tip 54 which may be gripped with the fingers to release the pawl from the ratchet teeth.

U.S. Pat. No. 5,549,429 to Sergent discloses a tool 30 for manipulating a ratcheted strap-tightening mechanism such as those associated with cargo securing harnesses. The tool comprises a handle having at a first end a socket adapted to engage the lever of the ratcheting mechanism, and a tongue adapted to unlock the ratcheting mechanism at the other end. The tongue is shaped and dimensioned to be inserted between the locking pawl and the drum to pry the pawl away from the teeth of the ratcheting mechanism.

U.S. Pat. No. 5,943,742 to Huang discloses a strap tightening/loosening device having two side plates with a connecting plate, a handle mounted to the side plates with a shaft extending through the handle and the side plates, and two ratchets mounted to the shaft. Each of the two side plates have two slots and an elongated slot, two members slide and are received within the two slots so that one of the members is engaged with the ratchets. The first member has two first pawls which engage the ratchets, while a second member also has two second pawls. The pawls are lifted from the ratchet by cam means when the handle is extended.

U.S. Pat. No. 6,059,499 to Bird discloses a retractable cargo securement strap assembly. A threaded post and a pair of clamps allow for removably mounting the housing of the strap assembly to a vehicle. A spool assembly situated within the housing makes it possible to retract the strap within the housing. The strap assembly has a locking assembly comprising a pivoting pawl which engages the teeth of a ratchet wheel. The pawl is disengaged from the ratchet wheel teeth by pushing a push button lever lifts an elongated arm which lifts the pawl from the teeth of the ratchet wheel.

U.S. Pat. No. 6,141,840 to Berkes discloses a buckle for releasably engaging a tongue of a cargo restraint system. The tongue is released from the buckle by lifting a lever to disengage the tongue. Berkes does not disclose a pawl and ratchet locking system with a lock release for the cargo restraint system.

U.S. Patent Application Publication No. 2003/0031524 to Brunet discloses a strap winch device assembly for fitting on a flat bed open truck trailer, to enable a truck driver to remotely activate the system without leaving the truck cab. The winch devices are connected along the side of the trailer to a single fore and aft drive shaft driven by a motor to tighten any straps that loosen during transit. A cable is connected at one end to a slider plate adjacent to biasing springs and at the other end to a clutch release handle member. Pulling upon the handle member pulls the cable, which moves the slider plate against the coil springs. The pulling force of the cable moves the shaft away from the drive shaft so that the teeth of the gears no longer are intermeshed.

U.S. Patent Application Publication No. 2003/0084550 to Fang discloses a strip safe-releasing device using a pawl and ratchet. A pawl engages the teeth of the ratchet to maintain the tension on the strip. The strip tension can be released by extending the handle so that the convex portion of the handle lifts the pawl from the teeth of the ratchet.

While the related art teach cargo restraint devices, there still exists a need for improved cargo restraints which have simple release mechanisms that do not require use of the hands.

OBJECTS

Therefore, it is an object of the present invention to provide an improved cargo restraint apparatus.

It is further an object of the present invention to provide a method of using an improved cargo restraint apparatus.

These and other objects will become increasingly apparent by reference to the following description.

SUMMARY OF THE INVENTION

The present invention provides a cargo restraint apparatus comprising a pallet with a mounting surface, a reel comprising a housing affixed to the mounting surface of the pallet, a spool rotatably mounted upon an axle attached to the housing, a ratchet wheel having a plurality of teeth coaxially linked to the spool, and a pawl pivotally mounted within the housing which removably engages the teeth of the ratchet with a pawl blade, thereby forming a reel locking mechanism, a strap retractably wound around the spool of the reel, so that the strap can be unwound from the spool to wrap over the cargo whereupon release of the tension and retraction of the strap locks the pawl blade into the teeth of the ratchet thereby locking the spool in place and preventing further extension of the strap to securely hold the cargo to the pallet, and a lock release comprising a pressure plate and a release shaft having a rotation restricting widthwise cross-section slidably mounted upon the pallet adjacent to the reel, projecting from the pressure plate and extending towards the pawl, whereupon application of a force to the pressure plate the force is transmitted to strike and pivot the pawl thereby removing the pawl blade from the teeth of the ratchet to allow the spool to turn and the strap to extend, thereby releasing the tension holding the cargo to the pallet.

In further embodiments of the cargo restraint apparatus the lock release further comprises at least one retainer attached to the release shaft which keeps the lock release from separating from the pallet. In further still embodiments of the cargo restraint apparatus the retainer is selected from the group consisting of pins, clips, and fins. In further still embodiments of the cargo restraint apparatus the lock release further comprises a spring which maintains the release shaft in a retracted position away from the pawl until the force is applied to the pressure plate. In further still embodiments of the cargo restraint apparatus the release shaft further comprises one or more stops which keep the release shaft from extending too far inwardly when the force is applied to the pressure plate. In further still embodiments of the cargo restraint apparatus the lock release further comprises one or more stabilizer shafts which stabilize the lock release when the force is applied to the pressure plate off center. In further embodiments of the cargo restraint apparatus the lock release is mounted within a recess in a side of the pallet. In further still embodiments of the cargo restraint apparatus the pressure plate extends from the recess such that it can be kicked by a user to release the cargo when the pallet is in a position to be unloaded.

The present invention further provides a method of using a cargo restraint apparatus comprising providing the cargo restraint apparatus comprising a pallet with a mounting surface, a reel comprising a housing affixed to the mounting surface of the pallet, a spool rotatably mounted upon an axle attached to the housing, a ratchet wheel having a plurality of teeth coaxially linked to the spool, and a pawl pivotally mounted within the housing which removably engages the teeth of the ratchet with a pawl blade, thereby forming a reel locking mechanism, a strap retractably wound around the spool of the reel, so that the strap can be unwound from the spool to wrap over the cargo whereupon release of the tension and retraction of the strap locks the pawl blade into the teeth of the ratchet thereby locking the spool in place and preventing further extension of the strap to securely hold the cargo to the pallet, and a lock release comprising a pressure plate and a release shaft having a rotation restricting widthwise cross-section slidably mounted upon the pallet adjacent to the reel, projecting from the pressure plate and extending towards the pawl; positioning the cargo upon the pallet; extending the strap around the cargo; retracting the strap to secure the cargo upon the pallet whereby the pawl blade pivots into the teeth of the ratchet to lock the spool of the reel; and applying a force to the pressure plate of the lock release which transmits the force to strike and pivot the pawl which disengages the pawl blade from the teeth of the ratchet, allowing the reel to freely rotate and the strap upon the reel to extend and release the cargo from the pallet. In further embodiments of the method the force to the pressure plate is applied by a user kicking the pressure plate to release the cargo from the pallet.

The present invention further provides a cargo restraint apparatus of the type with a reel having a pawl, ratchet and strap fastened to a pallet which holds cargo to the pallet during shipping, wherein the improvement comprises a pressure plate attached to a release shaft having a rotation restricting widthwise cross-section slidably mounted upon the pallet, whereupon application of a force to the pressure plate the force is transmitted to strike and pivot the pawl thereby removing the pawl from the teeth of the ratchet to allow the strap to extend, thereby releasing tension holding the cargo to the pallet.

DETAILED DESCRIPTION OF THE INVENTION

All patents, patent applications, government publications, government regulations, and literature references cited in this specification are hereby incorporated herein by reference in their entirety. In case of conflict, the present description, including definitions, will control.

Figure 1:
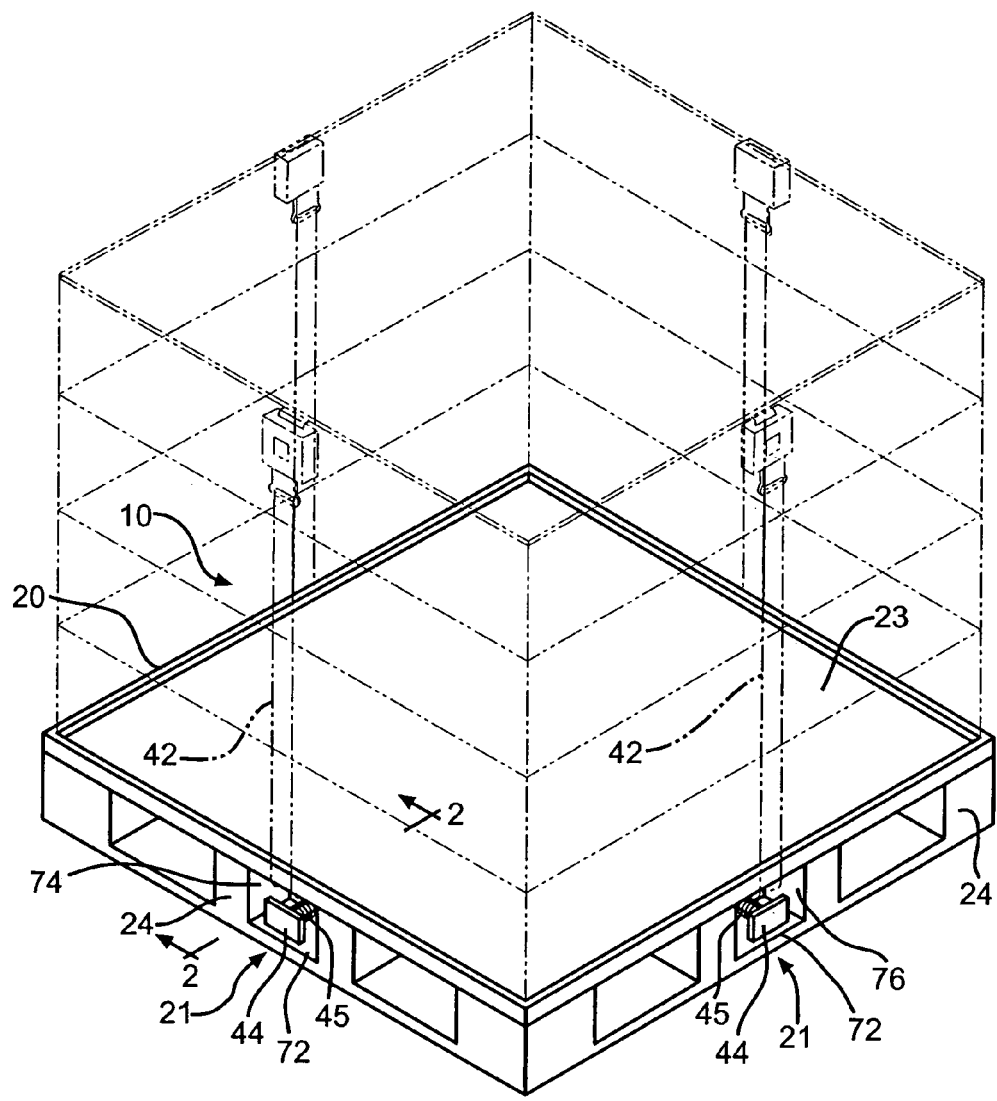
FIG. 1 is a perspective view of an embodiment of a cargo restraint apparatus of the present invention showing the lock release mounted on the pallet.
Figure 2:
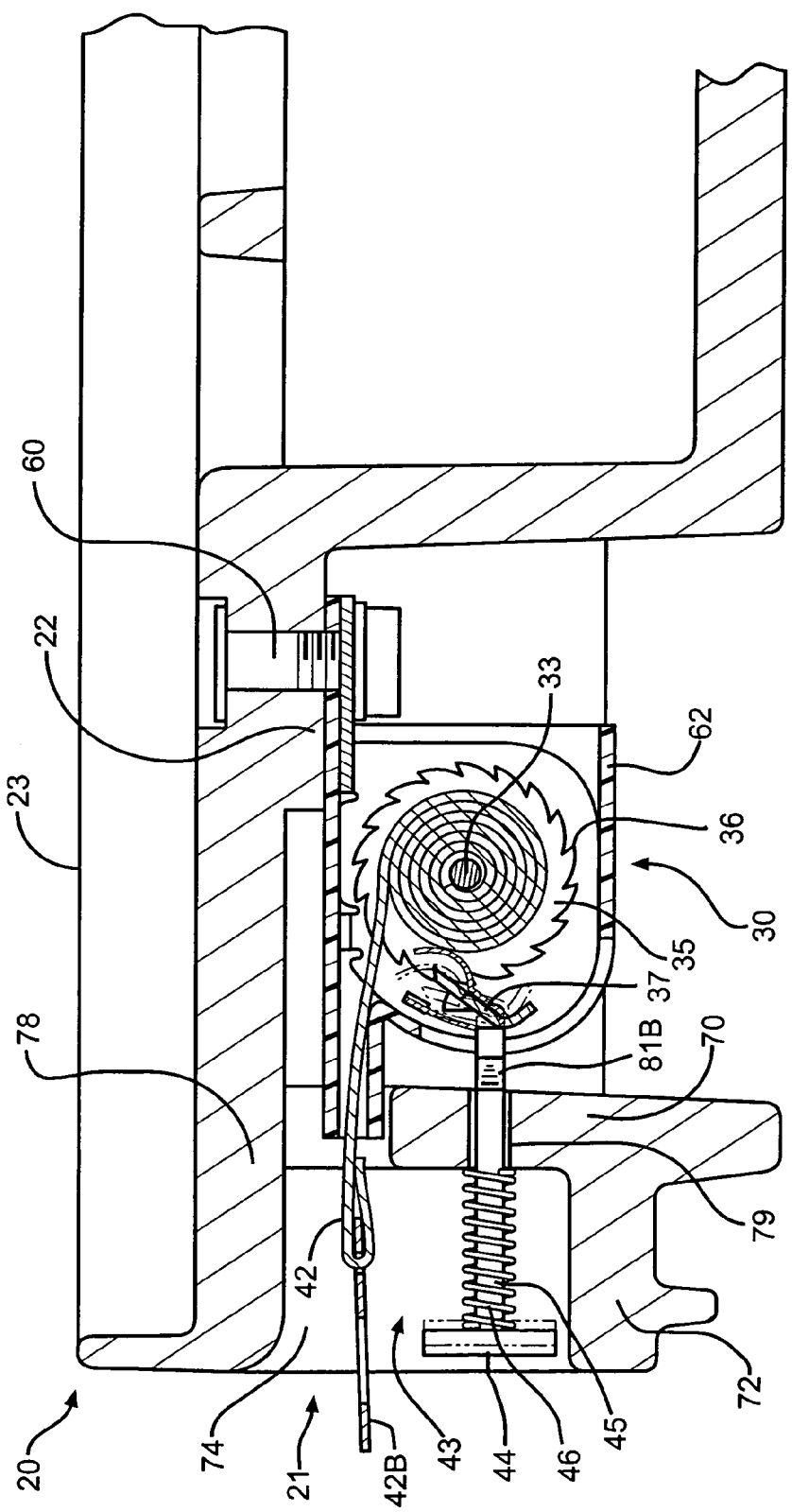
FIG. 2 is a cross-sectional view of the reel and lock release of the present invention taken along line 2—2 in FIG. 1.

One embodiment of the present invention of a cargo restraint apparatus 10 is illustrated in FIGS. 1–7 having a pallet 20 upon which the cargo is placed for shipping. The pallet 20 can be of any configuration known in the art. An embodiment is illustrated in FIG. 1, which has a top face 23, an opposing bottom face (not shown), and one or more sides 24. As illustrated in FIGS. 1 and 2, within the one or more sides 24 is a recess 21 defined by a back wall 70, a first side wall 74, a second side wall 76, a bottom wall 72, and a top wall 78 which is affixed beneath the top face 23 of the pallet 20. As illustrated in cross-section in FIG. 2, a reel 30 is attached behind the back wall 70 of the recess 21 to a mounting surface 22 continuous with the top wall 78 which is affixed beneath the top face 23 of the pallet 20. The reel 30 is secured to the mounting surface 22 by a bolt 60 or any other securing means known to a person skilled in the art. The reel 30 is enclosed within in a debris cover 62 to protect the reel from grit which might interfere with the workings of the reel 30. While FIG. 2 illustrates the reel 30 mounted in a preferred configuration, it is to be understood that any placement of the reel 30 which will allow it be accessed to tie down the cargo against the face of the pallet 20 is encompassed by the present invention.

Figure 3:
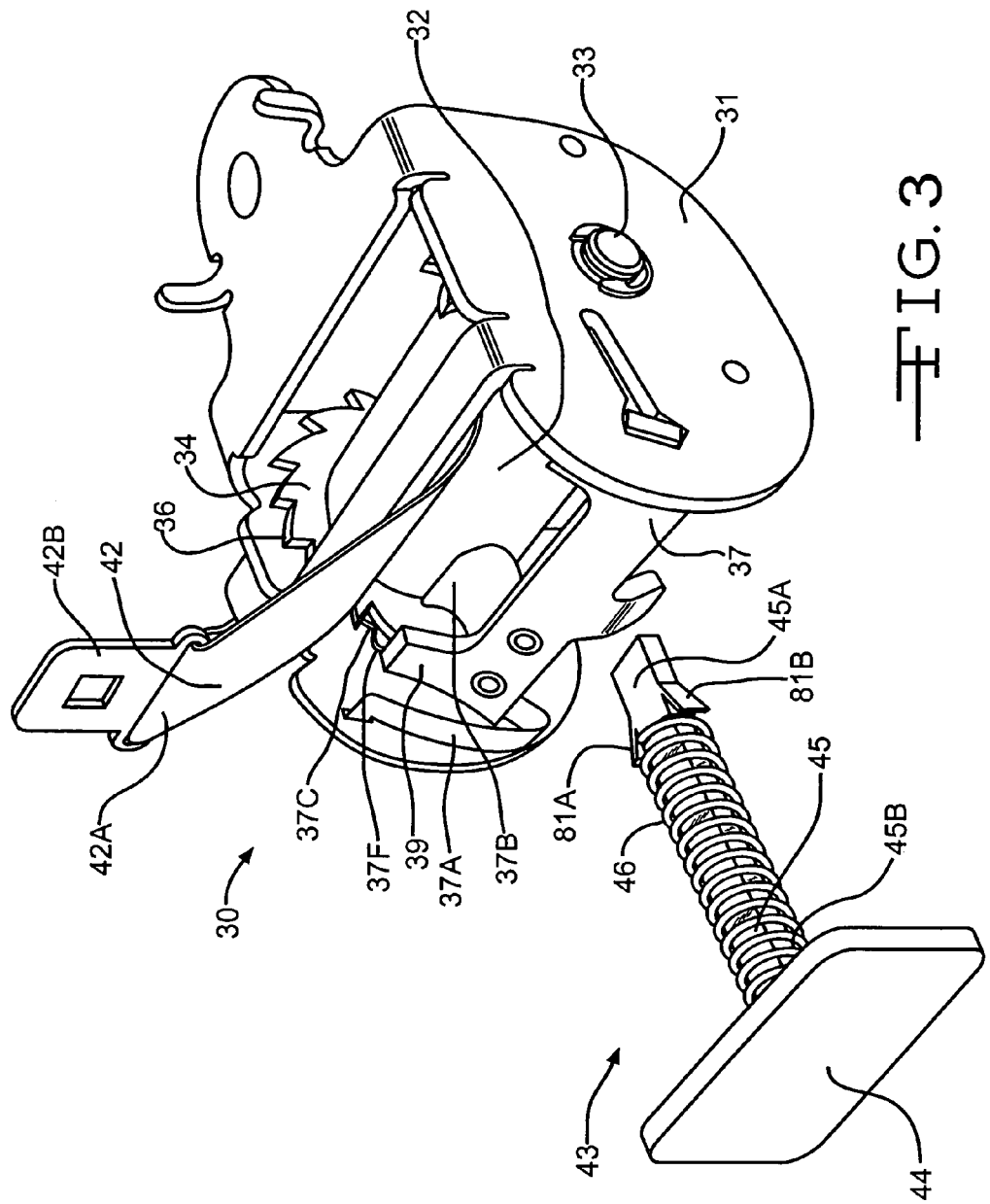
FIG. 3 is perspective view of an embodiment of the reel, belt and lock release of the present invention.
Figure 4:
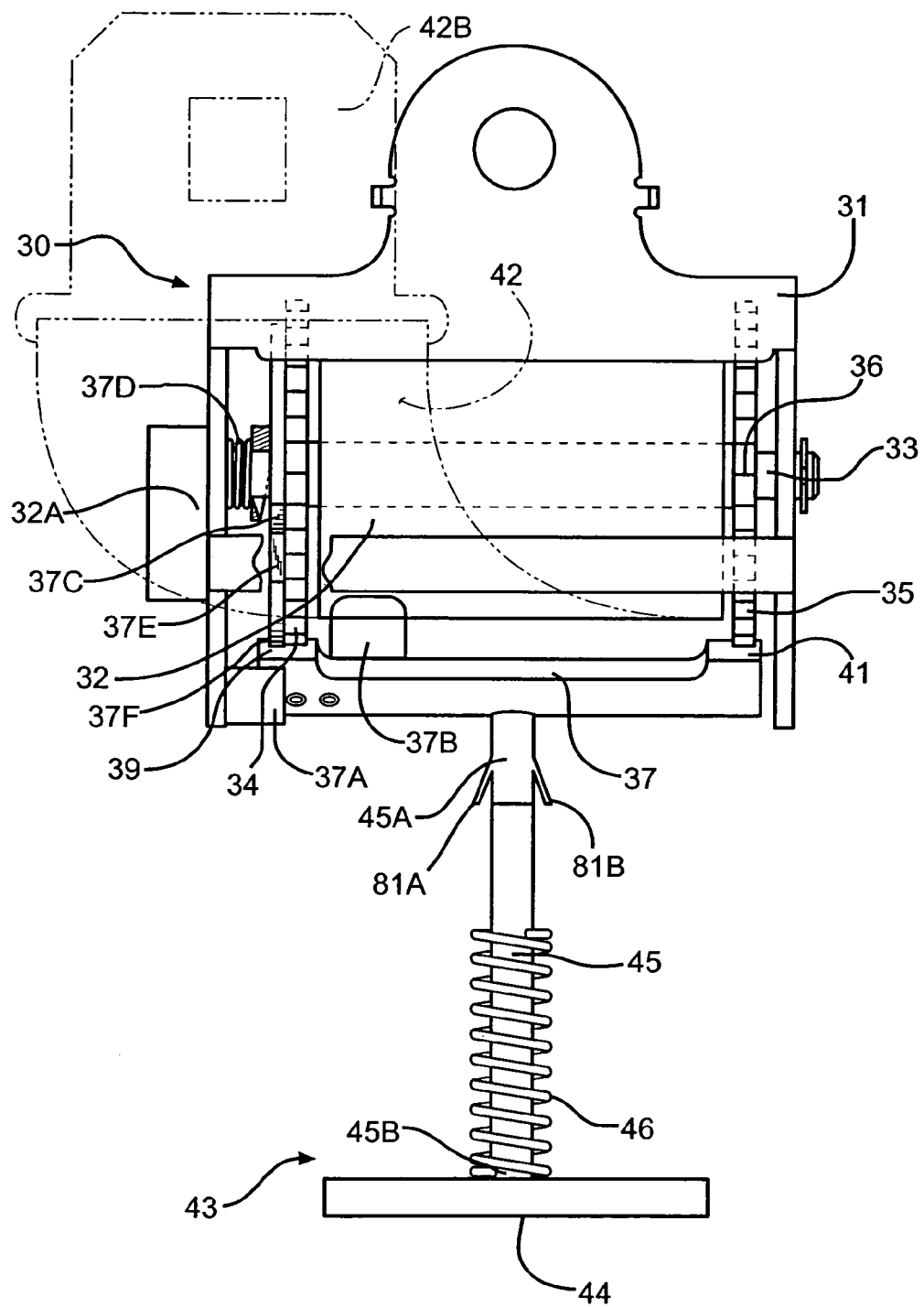
FIG. 4 is top view of an embodiment of the reel, belt and lock release of the present invention.

As illustrated in FIGS. 3 and 4, the reel 30 comprises a housing 31 which is affixed to the mounting surface 22 of the pallet 20 and a spool 32 rotatably mounted upon an axle 33 attached to the housing 31. The spool 32 rotation is resisted in one direction by a spool spring 32A which maintains a tension upon a strap 42 having a distal end 42A with an attached tongue 42B for a mating belt buckle (not shown) on the pallet lid, and a proximal end (not shown) attached and wound upon the spool 32. A reel locking mechanism is comprised of a first ratchet wheel 34 and second ratchet wheel 35 each having a plurality of teeth 36, which are coaxially linked to the spool 32, a pawl 37, a pawl spring 37A, pawl lifter 37C and pawl lifter spring 37D.

The pawl 37 having a first pawl blade 39 and a second pawl blade 41 is pivotably mounted within the housing near the outer radius of the first ratchet wheel 34 and the second ratchet wheel 35. The pawl is mounted forward of the spool 32 towards the back wall 70 of the recess 21 in the side 24 of the pallet 20. The pawl 37 is forced against the first ratchet wheel 34 and the second ratchet wheel 35 by the pawl spring 37A attached to the pawl 37 having a runner 37B at a first end and anchored to the housing 31 at an opposing second end to hold the first pawl blade 39 and second pawl blade 41 down onto the first ratchet wheel 34 and the second ratchet wheel 35, respectively. The pawl lifter 37C has a flat tooth 37E and a rounded tooth 37F each of which have a larger radius than the first ratchet wheel 34 The pawl lifter 37C is coaxially mounted upon the axle 33 with the spool 32 adjacent to the first ratchet wheel 34 where it is held against the first ratchet wheel 34 by the pawl lifter spring 37D mounted between the pawl lifter 37C and the housing 31.

When the strap 42 is fully retracted, the strap near the distal end 42A lifts upon the runner 37B of the pawl spring 37A, holding the pawl 37 high enough from the ratchet wheel 34 35 so that the flat tooth 37E of the pawl lifter 37C can slip beneath the first pawl blade 39. Extending the strap rotates the spool 32, whereupon the friction upon the pawl lifter 37C causes it to rotate with the spool 32 and move the flat tooth 37E of the pawl lifter 37C beneath the first pawl blade 39 so as to hold the pawl 37 in a disengaged position above the first ratchet wheel 34 and second ratchet wheel 35 until tension is released from the strap 42 to allow retraction of the strap 42. When the strap 42 retracts, the flat tooth 37E of the pawl lifter 37C rotates out from beneath the first pawl blade 39 so that the pawl 37 is free to rotate to engage the first ratchet wheel 34 and the second ratchet wheel 35, making further extension of the strap 42 impossible but allowing retraction.

Retraction is possible to further tighten the belt 42 to secure the cargo. The pawl 37 is lifted wherever further retraction is attempted by the rounded tooth 37F of the pawl lifter 37C whenever the spool rotates in the retracting direction. The pawl 37 removably engages the teeth 36 of the first ratchet wheel 34 and second ratchet wheel 35 with a first pawl blade 39 and second pawl blade 41, respectively. The strap 42 is retractably wound around the spool 32 of the reel 30, so that the strap 42 can be unwound from the spool 32 to wrap over the cargo whereupon release of the tension and retraction of the strap 42 locks the first pawl blade 39 and second pawl blade 41 into the teeth of the first ratchet wheel 34 and second ratchet wheel 35 to lock the spool 32 securely in place and preventing further rotation of the spool 32 and extension of the strap 42 thereby securely holding the cargo to the pallet 20.

Figure 5:
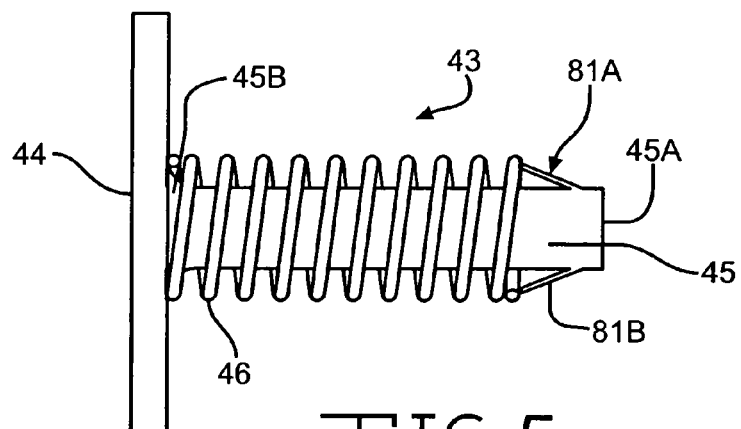
FIG. 5 is a top view of an embodiment of a lock release of the present invention.
Figure 6:
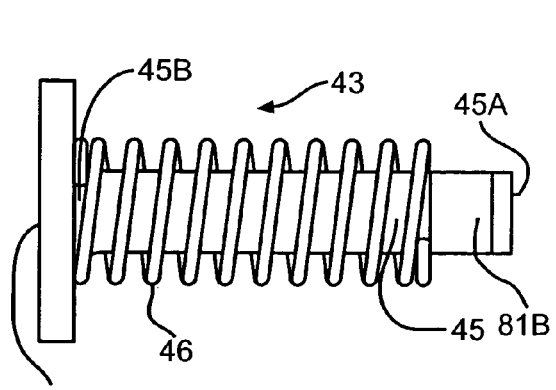
FIG. 6 is side view of an embodiment of a lock release of the present invention.
Figure 7:
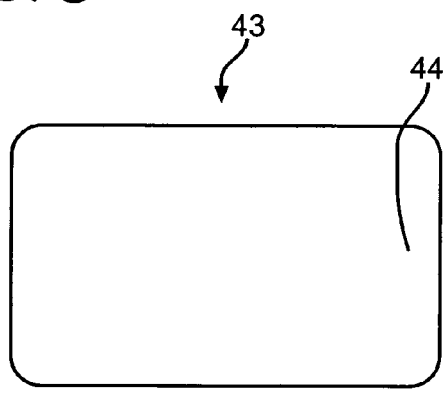
FIG. 7 is front view of an embodiment of a lock release of the present invention showing the pressure plate.

FIGS. 5–7 illustrate one embodiment of a lock release 43 comprising a pressure plate 44 and a release shaft 45 having a rectangular widthwise cross-section which is slidably mounted within a rectangular release shaft orifice 79 penetrating the back wall 70 within the recess 21 of the pallet 20 adjacent to the reel 30. While FIG. 2 illustrates one embodiment of the release shaft orifice 79, it is to be understood that the support can be contiguous with the reel housing, or can exist as a separately mounted apparatus. The release shaft 45 projects from the pressure plate 44 and extends towards the pawl 37 through release shaft orifice 79. Since the pawl 37 is situated forward of the spool 32, the release shaft 45 can directly contact the pawl 37 when the pressure plate 44 is pressed inward. The rectangular widthwise cross-section of the release shaft 45 fits within the rectangular release shaft orifice 79 in such a manner that the release shaft 45 is restricted rotationally around the lengthwise axis of the release shaft 45. In other embodiments of the lock release 43, the release shaft 45 and release shaft orifice 79 have any shape which will restrict rotation of the release shaft 45, including but not limited to triangular, rectangular, pentagonal, hexagonal, star-shaped polygon or any other polygonal shape. A lock release spring 46 encircling the release shaft 45 and resting towards the first end 45A of the release shaft 45 upon the back wall 70 and at the second end 45B of the release shaft 45 against the pressure plate 44 holds the release shaft 45 in a retracted position away from the pawl 37 until a force is applied to the pressure plate 44. The lock release 43 has a retainer at the first end 45A of the release shaft 45 comprised of a first retainer fin 81A and a second retainer fin 81B which together extend wider than the release shaft orifice 79, thereby keeping the release shaft 45 from pulling out of the release shaft orifice 79 and separating from the pallet 20. While the retainer illustrated in FIG. 8 is comprised of fins, it is to be understood that any retainers known in the art which are capable of holding the lock release 43 in place on the pallet 20 can be used.

Figure 8:
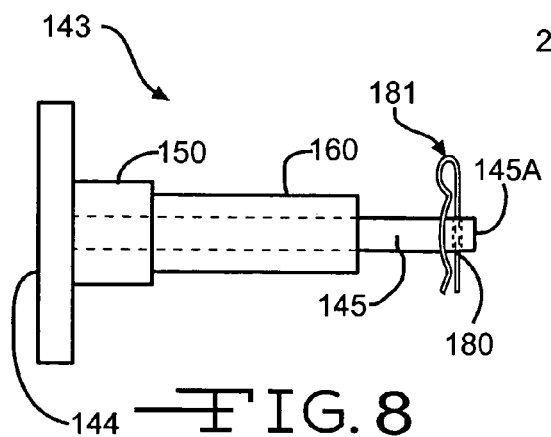
FIG. 8 is side view of a further embodiment of a lock release having shoulders.

FIG. 8 illustrates a further embodiment of a lock release 143 comprising a pressure plate 144 and a rectangular release shaft 145 having a first end 145A and an opposed second end affixed to the pressure plate 144. The release shaft has first shoulder 150 towards the second end 145B and a second shoulder 160 of smaller cross-sectional area extending coaxially from the first shoulder towards first end 145A of the release shaft 145. The rectangular release shaft 145 is slidably mounted within the rectangular release shaft orifice 79 penetrating the back wall 70 within the recess 21 of the pallet 20. The second shoulder acts as a stop to keep the release shaft 145 from extending farther than necessary to disengage the pawl 37. A hole 180 penetrating the release shaft 145 towards a first end 145A holds a retainer 181 which keeps the pressure plate 144 and release shaft 145 from separating from the pallet 20. While the retainer 181 illustrated in FIG. 8 is a pin, it is to be understood that any fastener known in the art, including but not limited to a cotter pin or a clip, which is capable of holding the lock release 143 in place can be used as a retainer. Further embodiments of the release shaft 145 have two or more holes for holding the retainer 181 in place.

Figure 9:
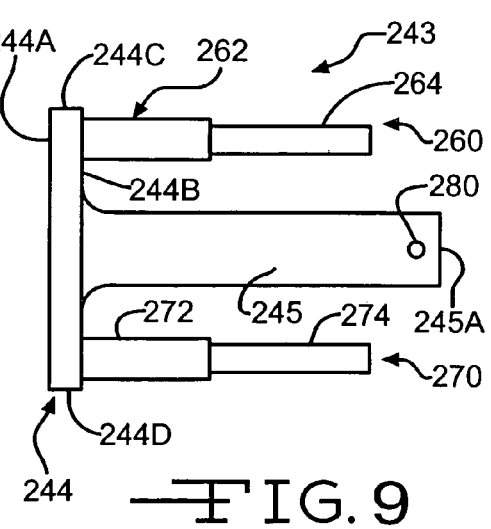
FIG. 9 is top view of a still further embodiment of a lock release having stabilizer shafts.

FIG. 9 illustrates a still further embodiment of a lock release 243 comprising a pressure plate 244 having a front face 244A and opposed back face 244B, a first edge 244C and an opposed second edge 244D, and a rectangular release shaft 245 having a first end 245A and an opposed second end attached to the back face 244B of the pressure plate 244. A first stabilizer shaft 260 having a shoulder portion 262 attached to the back face 244B of the pressure plate 244 towards the first edge 244C, and a narrow portion 264 which extends coaxially from the shoulder portion 262 to penetrate the back wall 70 of the recess 21. Likewise a second stabilizer shaft 270 having a shoulder portion 272 attached to the back face 244B of the pressure plate 244 towards the second edge 244D, and a narrow portion 264 which extends coaxially from the shoulder portion 272 to penetrate the back wall 70 of the recess 21. The first stabilizer shaft 260 and the second stabilizer shaft 270 thereby further support the pressure plate against twisting forces when a force is applied off center. Additionally, the shoulder portion 262 and shoulder portion 272 together act as a stop to keep the lock release 243 from extending too far inwardly. A hole 180 penetrating the release shaft 145 towards the first end 245A holds a retainer (not shown) which keeps the pressure plate 144 and release shaft 145 from separating from the pallet 20.

Upon application of the force, particularly by kicking with the foot, to the pressure plate 44 the force is transmitted to strike and pivot the pawl 37 thereby removing the first pawl blade 39 and the second pawl blade 41 from the teeth 36 of the first ratchet wheel 34 and the second ratchet wheel 35, respectively, to allow the spool 32 to turn and the strap 42 to extend, thereby releasing the tension holding the cargo to the pallet 20.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A cargo restraint apparatus for cargo comprising:
   (a) a pallet with a reel mounting surface;
   (b) a reel comprising a housing affixed to the mounting surface of the pallet, a spool rotatably mounted upon an axle attached to the housing, a ratchet wheel having a plurality of teeth coaxially linked to the spool, and a pawl pivotally mounted within the housing which releasably engages the teeth of the ratchet with a pawl blade on the pawl, thereby forming a reel locking mechanism;
   (c) a strap retractably wound around the spool of the reel for holding the cargo on the pallet, so that the strap can be unwound from the spool to wrap over the cargo whereupon release of the tension and retraction of the strap locks the pawl blade into the teeth of the ratchet thereby locking the spool in place and preventing further extension of the strap to securely hold the cargo to the pallet; and
   (d) a lock release comprising a pressure plate and a release shaft having a rotation restricting widthwise cross-section slidably mounted on the pallet adjacent to the reel and projecting from the pressure plate and extending towards the pawl, whereby upon application of a force to the pressure plate the force is transmitted to strike and pivot the pawl thereby removing the pawl blade from the teeth of the ratchet to allow the spool to turn and the strap to extend, thereby releasing the tension holding the cargo to the pallet.

2. The cargo restraint apparatus of claim 1 wherein the lock release further comprises at least one retainer means attached to the release shaft which keeps the lock release from separating from the pallet.

3. The cargo restraint apparatus of claim 2 wherein the retainer means is selected from the group consisting of pins, clips, and fins on or through the release shaft.

4. The cargo restraint apparatus of claim 2 wherein the lock release further comprises a spring which maintains the release shaft in a retracted position away from the pawl until the force is applied to the pressure plate.

5. The cargo restraint apparatus of claim 1 wherein the release shaft further comprises one or more stops which keep the release shaft from overextending inwardly when the force is applied to the pressure plate.

6. The cargo restraint apparatus of claim 1 wherein the lock release further comprises one or more stabilizer shafts adjacent to the release shaft which stabilize the lock release when the force is applied to the pressure plate off center.

7. The cargo restraint apparatus of claim 1 wherein the lock release is mounted within a recess in at least one side of the pallet.

8. The cargo restraint apparatus of claim 7 wherein the pressure plate extends from the recess such that it can be kicked by a user to release the strap around the cargo when the pallet is in a position to be unloaded.

9. A method of using a cargo restraint apparatus comprising:
(a) providing the cargo restraint apparatus for cargo comprising a pallet with a reel mounting surface, a reel comprising a housing affixed to the mounting surface of the pallet, a spool rotatably mounted upon an axle attached to the housing, a ratchet wheel having a plurality of teeth coaxially linked to the spool, and a pawl pivotally mounted within the housing which releasably engages the teeth of the ratchet with a pawl blade on the pawl, thereby forming a reel locking mechanism, a strap retractably wound around the spool of the reel for holding the cargo on the pallet, so that the strap can be unwound from the spool to wrap over the cargo whereupon release of the tension and retraction of the strap locks the pawl blade into the teeth of the ratchet thereby locking the spool in place and preventing further extension of the strap to securely hold the cargo to the pallet; and a lock release comprising a pressure plate and a release shaft having a rotation restricting widthwise cross-section slidably mounted on the pallet adjacent to the reel and projecting from the pressure plate and extending towards the pawl;
(b) positioning the cargo upon the pallet;
(c) extending the strap around the cargo;
(d) retracting the strap to secure the cargo upon the pallet whereby the pawl blade pivots into the teeth of the ratchet to lock the spool of the reel; and
(e) applying a force to the pressure plate of the lock release which transmits the force to strike and pivot the pawl which disengages the pawl blade from the teeth of the ratchet, allowing the reel to freely rotate and the strap upon the reel to extend and release the cargo from the pallet.

10. The method of claim 9 wherein the force to the pressure plate is applied by a user kicking the pressure plate to release the cargo from the pallet.

11. In a cargo restraint apparatus with a reel having a pawl, ratchet and strap fastened to a pallet which holds cargo to the pallet during shipping, wherein the improvement comprises:
a pressure plate attached to a release shaft having a rotation restricting widthwise cross-section slidably mounted on the pallet, whereupon application of a force to the pressure plate the force is transmitted to strike and pivot the pawl thereby disengaging the pawl from the teeth of the ratchet to allow the strap to extend, thereby releasing tension holding the cargo to the pallet.

* * * * *